Dec. 18, 1962   R. A. VAN KERSCHAVER   3,068,969
OUTSIDE MIRROR MOUNTING
Filed March 30, 1961
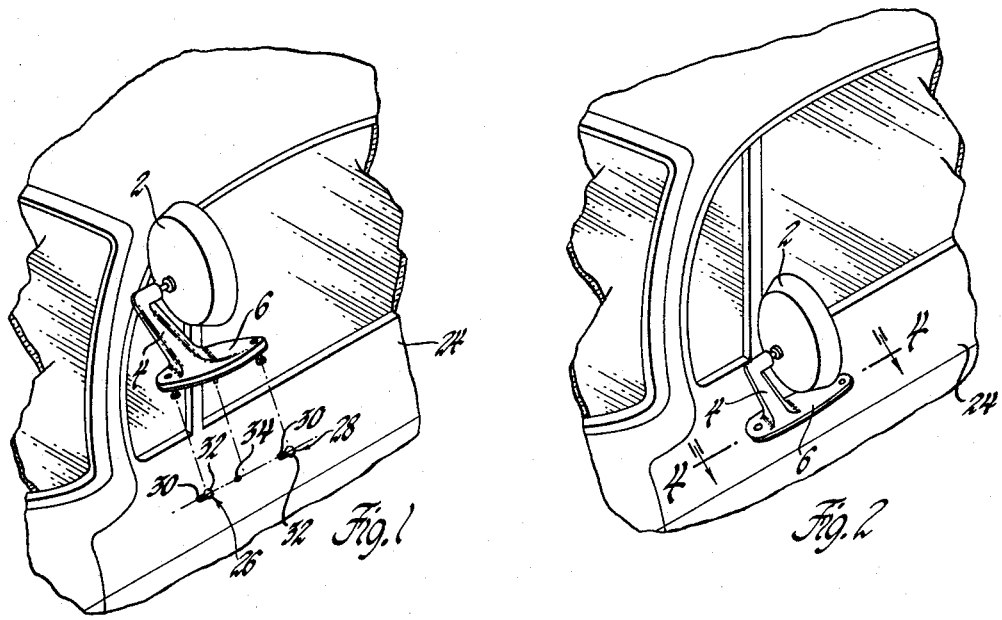
Fig. 1
Fig. 2
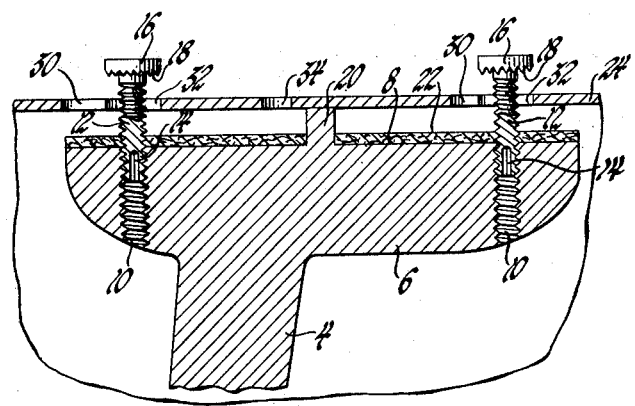
Fig. 3
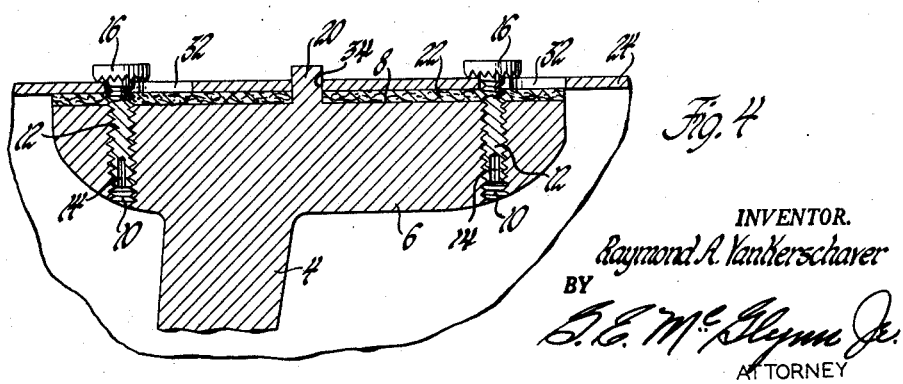
Fig. 4
INVENTOR.
Raymond R. VanKerschaver
BY
B.E. McGlynn Jr.
ATTORNEY United States Patent Office 3,068,969
Patented Dec. 18, 1962

3,068,969
OUTSIDE MIRROR MOUNTING
Raymond A. Van Kerschaver, St. Clair Shores, Mich., assignor to General Motors Corporation, Detroit, Mich., a corporation of Delaware
Filed Mar. 30, 1961, Ser. No. 99,436
2 Claims. (Cl. 189—36)

This invention pertains to means for attaching a device such as a rearview mirror directly to a support panel and, more particularly, to a means for attaching an outside rearview mirror to a body panel of a vehicle in such a manner as to eliminate the need for any intermediate attaching bracket, discourage theft of the mirror and generally improve the appearance of the mirror assembly.

With reference to a preferred use of the invention to be described, the current practice in securing an outside rearview mirror to the outer sheet metal of the doors or fenders of a vehicle involves mounting a retainer bracket directly to the door or fender panel by sheet metal screws, and then mounting the base of the mirror support over the retainer bracket and securing it thereto by a suitable screw which is easily accessible and in plain view. This practice is followed because it is impractical to use fasteners which must be tightened from underneath the mirror support; that is, from within the door or underneath the fender panel. Furthermore, the fastener or screw used to hold the mirror support on the retainer bracket is readily accessible and encourages theft of the mirror, and also detracts from the appearance of the assembly.

It is a principal object and feature of this invention to provide, in combination with a rearview mirror or other device, means for attaching such a device directly to a support panel thereby eliminating the need for any intermediate retainer bracket.

It is yet a more specific object and feature of this invention to provide a rearview mirror support having attaching means associated therewith for connection directly to the exterior sheet metal of a vehicle body without requiring any adjustment from beneath the sheet metal.

It is yet another object and feature of this invention to provide an attaching means for a rearview mirror support and the like characterized by fasteners on the mirror support cooperating in such a manner with slots contained on a support panel as to permit rigid securing of the mirror support to the panel from the outside of the latter, and in such a manner as to discourage theft of the mirror and improve the appearance of the mirror assembly.

These and other objects, features and advantages of this invention and the manner in which they are attained will become more apparent hereinafter as the description of the invention proceeds, and in which reference is made to the drawings in which:

FIGURE 1 is a fragmentary perspective view of an automotive vehicle showing a mirror assembly in position for mounting thereon;

FIGURE 2 is a view corresponding to FIGURE 1, but illustrating the mirror assembly securely mounted in place;

FIGURE 3 is a view taken generally on line 4—4 of FIGURE 2 but showing an intermediate step in mounting the mirror assembly in the position of FIGURE 2; and FIGURE 4 is a view taken on line 4—4 of FIGURE 2.

The drawings illustrate a rearview mirror assembly comprising a mirror body 2 carrying the usual mirror element (not shown), suitably adjustably mounted on the upper end of a mirror support bracket 4 having an elongate foot or base 6 including base surface 8. A pair of spaced parallel threaded bores 10 are provided at each end of the base 6 and extend entirely therethrough substantially perpendicular to base surface 8. A threaded screw 12 is threadably engaged in each bore 10 and includes an Allen head or hexagonal recess 14 in one end thereof so as to be accessible to an adjusting tool insertable into the bores, and an enlarged head 16 at the other end thereof having a serrated surface 18 presented toward the bottom of the base 6. A locating pin 20 of suitable shape projects from the base surface 8 on an axis generally parallel to the screws. A suitable gasket 22 covers the base surface 8, and surrounds the threaded portions of the screws and the locating pin 20.

While the mirror support bracket may be located in various positions including on a fender of the vehicle, the drawings illustrate such bracket as being mounted on the outer sheet panel member 24 of the left front door construction of a vehicle. This panel member includes a pair of aligned keyhole slots 26 and 28 each of which includes a narrow elongate portion 30 terminating in the usual enlarged head portion 32. A locating aperture 34 having a shape corresponding to that of pin 20 is located between the keyhole slots. To facilitate locating and locking the base of the mirror bracket against endwise movement in the keyhole slots, as will appear hereinafter, the spacing of the locating aperture 34 from the head portions 32 of the respective keyhole slots differs from the spacing of the locating pin 20 from the heads 16 of the fasteners or; that is, the pin 20 is substantially equidistantly spaced from the fasteners while the aperture 34 is closer to the head portion of one keyhole slot than to the other.

To install the mirror support bracket on the panel member 24, a suitable Allen head tool is inserted through the upper end of the bores 10 and into the hexagonal recesses 14 in the fasteners to thread the heads of the fasteners away from the base surface 8 into the position shown in FIGURES 1 and 3. The heads and part of the threads of the screws 12 are passed through the head portions 32 of each keyhole slot. At this time, and as illustrated in FIGURE 3, the locating pin 20 is out of alignment with the locating aperture 34. Thereafter, the base 6 is shifted endwise of the keyhole slots or to the left in FIGURE 3 to cause the locating pin to become aligned with the locating aperture and the screws 12 to enter the narrow elongate portions 30 of the keyhole slots. At this time, the locating pin seats within the locating aperture and the base surface 8 and gasket 22 rest against panel 24. The Allen head tool is then manipulated to thread the screws into the bores 10 causing the serrated surface 18 or each screw head 16 to engage panel 24.

As a consequence, the mirror bracket 4 is firmly secured directly to panel 24 thereby eliminating the intermediate retainer bracket heretofore employed in assemblies of this type, while still permitting installation from the exterior of the vehicle. Furthermore, since a special Allen head screw is used in this assembly, the mirror is less susceptible to theft, and the screws are contained wholly entirely within the base as illustrated in FIGURE 4 thereby improving the appearance of the mirror by eliminating any exposed screw heads.

While but one form of the invention has been shown and described, other forms will now be apparent to those skilled in the art. Therefore, the embodiment shown in the drawing is merely for illustrative purposes, and is not intended to limit the scope of the invention which is defined by the claims which follow.

I claim:

1. Means for connecting a member to a panel comprising a pair of spaced keyhole slots on said panel, each of said slots including a narrow elongate portion terminating at one thereof in an enlarged head portion, a locating aperture in said panel between said slots, a pair of spaced fasteners each including a threaded portion adjustably threadably engaged with said member and having an enlarged head at one end thereof, and a locating pin projecting from said member between said fasteners, the spacing of said locating pin from said fasteners being different from the spacing of said locating aperture from said slots whereby the head and threaded portion of each fastener may be inserted through the head portion of a respective slot with said locating pin out of alignment with said locating aperture, and relative movement of said member and said panel seats said locating pin in said locating aperture and said member against said panel and disposes the threaded portion of each fastener within the narrow elongate portion of each slot so that adjustment of said fasteners on said member engages the heads thereof with said panel to connect said member to said panel.

2. Means for connecting a member to a panel comprising a pair of spaced and aligned keyhole slots on said panel, each of said slots including a narrow elongate portion terminating at one thereof in an enlarged head portion, a locating aperture in said panel between said slots, a pair of spaced fasteners each including a threaded portion adjustably threadably engaged with said member on parallel axes and having an enlarged head at one end thereof, and a locating pin projecting from said member on an axis parallel to and between the axes of said fasteners, the spacing of said locating pin from the heads of said fasteners being different from the spacing of said locating aperture from the head portions of said slots whereby the head and threaded portion of each fastener may be inserted through the head portion of a respective slot with said locating pin out of alignment with said locating aperture, and relative movement of said member and said panel endwise of said slots seats said locating pin in said locating aperture and said member against said panel and disposes the threaded portion of each fastener within the narrow elongate portion of each slot so that adjustment of said fasteners on said member engages the heads thereof with said panel to connect said member and panel.

References Cited in the file of this patent
UNITED STATES PATENTS

| | | |
|---|---|---|
| 2,226,482 | Sarnes | Dec. 24, 1940 |
| 2,563,976 | Torosian | Aug. 14, 1951 |